Patented Feb. 20, 1923.

1,446,378

UNITED STATES PATENT OFFICE.

WALTER O. BORCHERDT, OF AUSTINVILLE, VIRGINIA, ASSIGNOR TO THE NEW JERSEY ZINC COMPANY, OF NEW YORK, N. Y., A CORPORATION OF NEW JERSEY.

FILTRATION OF ORE PULPS.

No Drawing. Application filed January 5, 1920. Serial No. 349,571.

*To all whom it may concern:*

Be it known that I, WALTER O. BORCHERDT, a citizen of the United States, residing at Austinville, Virginia, in the county of Wythe, State of Virginia, have invented certain new and useful Improvements in the Filtration of Ore Pulps; and I do hereby declare the following to be a full, clear, and exact description of the invention, such as will enable others skilled in the art to which it appertains to make and use the same.

This invention relates to the filtration of ore pulps or ore slimes, and contemplates certain improvements in the method of filtering ore pulps containing colloidal matter.

The colloidal constituents of an ore pulp are rarely, if ever, naturally deflocculated or dispersed to their maximum possible extent. I have found that when partially flocculated the adsorption, mechanical entanglement, or other form of attachment between the colloidal and granular constituents of an ore pulp is, in general, more pronounced than that which exists when the colloidal constituents have been thoroughly deflocculated or dispersed.

In the heretofore customary methods of filtering ore pulps containing colloidal matter, the colloidal matter when it exists in a relatively deflocculated or dispersed condition partially passes through the filter cake and tends to fill up the pores or interstices of the filtering medium, and thus seriously interferes with the efficiency of the filtration. As the result of this interference by the colloidal constituents of the ore pulp, only a relatively small body of pulp can be filtered before it becomes necessary to wash or clean the filtering medium, and consequently, the filter cake obtained is relatively thin, excessive vacuum or pressure is required for its formation and the cloth or other filtering medium must be frequently cleaned or renewed. When the colloidal matter is present in a coagulated or flocculated condition and admixed with the mineral particles in the ore pulp, these difficulties become more pronounced since not only is the filtering medium itself clogged or obstructed by the colloidal materials which fill up the pores or interstices thereof, but the filter cake is made up, in considerable part, of the colloidal constituents which reduce its porosity and increase its capacity for retaining water.

The present invention contemplates, as a preliminary or preparatory step in the filtration of ore pulps, the removal of the colloidal constituents from the ore pulp to a sufficient extent to effectively promote the subsequent filtering operation. I have found when the colloidal matter is removed from an ore pulp in accordance with the invention, that the pulp can then be filtered much more readily and much more quickly and that a thicker filter cake with diminished water-holding capacity, can be obtained, which possesses the further advantageous characteristic of being more or less porous, due to the absence of colloidal matter, and as a consequence of this porosity the filter cake can be more readily dried, while the filter cloth or other medium retains its permeability for a longer time and with less cleaning and attains a longer useful life.

I have found that the colloids are more readily separated from the ore pulp when they are in a dispersed or deflocculated state. Accordingly, I subject the ore pulp to appropriate treatment for dispersing or deflocculating the colloidal constituents. Various deflocculating agents, as well as procedures for treating the ore pulp, are available for this purpose, as will be fully explained hereinafter. When the colloids are in a dispersed or deflocculated state they may be readily removed from the ore pulp by sedimentation and decantation. Thus, the ore pulp containing dispersed or deflocculated colloids is permitted to settle in suitable tanks or basins, and the supernatant liquor containing the dispersed colloids is withdrawn by decantation, leaving the settled mineral particles with a materially reduced proportion of colloidal matter. The settled mineral particles resulting from this sedimentation and decantation operation for the removal of colloids may be conducted directly to the filtering apparatus or may be diluted with colloid-free water to secure any desired consistency for the subsequent filtration operation.

The colloidal matters present in an ore pulp are probably derived for the most part from the gangue particles of the ore, although it is not unlikely that mineral particles may be present in the pulp in the form of colloids. Such colloidal matters may also be introduced with the milling water which is used to form the ore pulp, and this source of colloidal matters may be considerable during periods of heavy rainfall, when surface waters containing mud and other suspended matters and heavily charged with both organic and inorganic colloidal materials run into the stream from which the milling water is customarily taken.

The colloidal matters may be present as pure colloids, organic or inorganic, or in a state bordering on the so-called "coarse suspensions." Throughout this specification and the appended claims, I intend to embrace in the expressions "colloids," "colloidal matter" and "colloidal constituents" both true colloids and those quasi or borderland substances which may not be purely colloidal, but partake of the qualities of, or resemble, colloids, and without regard to the source from which such colloidal matters are derived. Thus, for the purposes of the present invention, the colloidal constituents may be considered as ranging from just above the molecular size upward through the class of so-called suspensoids, which, while possibly not true colloids, still, because of their relatively large surface, exhibit some, if not all, of the properties of colloids, and are capable of existing in both the sol and gel state, or of being dispersed and coagulated, or flocculated and deflocculated. By colloidal matter, therefore, I mean material which is not necessarily a true colloid, but exhibits colloidal characteristics to a sufficient degree to make it amenable to the manipulation hereinafter described.

The present invention, in its broad aspect, contemplates, as an improvement in the filtration of ore pulps, and as a preliminary step to the filtering operation proper, the removal of colloidal constituents to the desired extent from the mineral or ore pulp. The removal of the colloidal constituents may be effected in various ways. Thus, for example, these constituents may be removed by sedimentation and decantation, or they may be removed by a flotation treatment conducted under such conditions as to inhibit the flotation of mineral particles, while permitting the removal of the colloidal constituents in the form of a colloid-bearing froth. After the removal of the colloidal constituents in accordance with the principles of this invention, the ore pulp is subjected to filtration in accordance with any of the usual practices.

The removal, by sedimentation and decantation, from the mineral ore pulp of the colloidal constituents, depends for its effectiveness upon the relative difference in the rate of settling or sedimentation of the ore particles or mineral particles and the colloidal constituents. For this reason it is desirable to cause the colloidal constituents to settle at a much slower rate than the mineral and gangue particles in the ore pulp, whereby, after a predetermined settling of the mineral and gangue particles, any desired portion of the supernatant liquor containing the slower-settling colloidal constituents can be decanted in any suitable way to effect the removal from the ore pulp of the desired quantity of the colloidal constituents. In this connection, the present invention contemplates the dispersion or deflocculation of the colloidal constituents so as to cause them to settle at a very much slower rate than would be the case if they were coagulated or flocculated, so that they will remain in more or less permanent suspension in quiet pulp, thus permitting settling or sedimentation of the sands and slimes containing the valuable minerals, and decantation by displacement, or otherwise, of the water containing the suspended colloids or colloidal slimes.

In accordance with this aspect of the present invention, the ore pulp is treated with a deflocculating or dispersing agent in order to convert the colloids into a deflocculated or dispersed state and separating the dispersed or deflocculated colloids or colloidal slimes by decantation, or otherwise, from the ore pulp prior to the filtration operation. As a result of this removal of the colloids in a dispersed or deflocculated state, the ore pulp is thereby freed from such colloidal matter, to the desired extent, so that the filtration operation can thereafter be carried out without encountering the objections hereinbefore mentioned.

With the removal of the colloidal constituents there will, of course, also be removed a corresponding portion of the water of the ore pulp, together with such constituents as are dissolved therein. The remaining ore pulp, which is accordingly in a more concentrated state, may be diluted, if desired, with colloid-free water to secure the proper consistency for effective filtration. The removal of the colloids from the ore pulp enables the ore pulp to be treated in a state of greater density, that is, in a more concentrated form, and in general, it will probably be found advantageous to subject the ore pulp in this concentrated form directly and without dilution to the subsequent filtering operation.

With lead-zinc sulfide ores I have used with advantage sodium silicate as the dispersing agent, but, in general, other agents may be employed which will bring about the desired dispersion or deflocculation. The nature of the agent will vary somewhat with different ore pulps, because the colloidal slimes vary, in some cases being of a basic character and in others of an acid character, and in some cases being positively charged, and in other cases being negatively charged. The dispersing or deflocculating agent should be properly chosen with reference to the colloidal properties of the ore pulp and in accordance with the known principles of colloid chemistry, so that the desired deflocculation or dispersion will take place. Using sodium silicate, I have found that good results are obtained with an exceedingly small amount, for example, from four pounds down to a fraction of a pound of the sodium silicate per ton of dry ore treated. The dispersing agent or agents may be of an acid character, in case the colloidal constituents are such as are dispersed by an acid reagent, or of an alkaline character, if the preliminary tests indicate this to be desirable. The agent or agents may themselves partake of a colloidal character, as, for example, silicic acid or sodium or potassium silicates, or soaps which also display acid or alkaline characteristics, for example, gum arabic (acacia) in small amounts may be added to promote the desired dispersion and separation of the colloids.

The dispersion of the colloids (whether adsorbed by the mineral particles or otherwise coagulated or flocculated) may be promoted, or even brought about, to a greater or less extent, by rapid circulation and agitation of the pulp, which will serve to distribute the deflocculating agent, if any is used, and cause abrasion of the mineral particles with each other and with floccules or coagules of colloidal matter in which the mineral particles may be enmeshed, so that separated and dispersed colloids may be more readily removed by decantation. Variation in temperature may similarly be of assistance in bringing the colloids into a state permitting their removal from the ore pulp. Thus, where desired, the ore pulp may be cooled by dilution with cold water, either natural or cooled by spray evaporation or film evaporation, or by direct cooling of the pulp by similar means, and the pulp may be heated directly or by means of steam coils or of steam blown into the pulp.

I have found that an extremely convenient and effective way of securing the necessary distribution of the dispersing or deflocculating agent through the mass of the ore pulp, and of securing the desired degree of dispersion or deflocculation of the colloids present in the pulp, consists in adding the deflocculating or dispersing agent to the pulp at some point prior to the admission of the ore pulp to the ball or pebble mills, or other fine-grinding machines. Such machines almost invariably form a part of the equipment of ore dressing plants, as a preliminary step in the process of preparing ores for concentration or for the recovery of values.

By adding the deflocculating or dispersing agent to the ore pulp ahead of the fine-grinding mills, the necessary mixture is secured without inconvenience or added expense, and the dispersion or deflocculation of the colloids or colloidal slimes takes place under the most favorable conditions of violent agitation. Under these conditions floccules or coagules are readily broken up and prevented from re-forming, and the particles already coated with colloids or enmeshed within floccules are cleaned or released. Such colloids as are released from the solid or indurated condition by the grinding are immediately placed in the dispersed or deflocculated state, and the fresh mineral surfaces exposed by the grinding are prevented from being covered with coatings of colloidal material. This procedure may, with some ores, be sufficient to effect the desired degree of deflocculation, without the use of a deflocculating agent, provided the decantation of the colloidal constituents is effected immediately after the pulp leaves the grinding machine. Whatever may be the preliminary treatment, or combination of treatments, to which the ore pulp is subjected for the dispersion or deflocculation of its colloids, these colloids are, according to the present invention, removed from the ore pulp, for example, by decantation, to the extent necessary to prevent them from interfering with the subsequent filtering of the pulp.

The colloidal slimes which are separated from the ore pulp, in accordance with the invention, are commonly of a character such that they can be run to waste. In case, however, these slimes carry sufficient values, they may be themselves subjected to a further treatment for the recovery of the values therefrom. The water accompanying the removed colloids may also be separated and recovered for use. The colloidal constituents contained therein may thus be coagulated and settled or filtered out. The water thus separated from the colloids may be purified, if necessary, to free it from dissolved salts prejudicial to the maintenance of the desired state of colloidal dispersion in the ore pulp to which it may be subsequently added.

Where the ore pulp contains in solution in the water thereof constituents which prevent dispersion or deflocculation of the colloids, such constituents may be removed, as by the removal of the water from the ore pulp prior to the dispersion or deflocculation treatment, or they may be otherwise neutralized and rendered harmless by methods and agents which are generally known and can be regulated by simple tests. For example, an excessive quantity of magnesium sulfate or other electrolyte in the pulp interferes with the proper action of sodium silicate as a dispersing agent. Such a condition may be corrected by washing the ore for the removal of soluble salts. Where the pulp is acid or where there is latent acidity due to the occlusion of sulfur dioxide, an alkaline agent may be added to correct the acidity, whereby the sodium silicate is enabled to act in the desired manner. The decantation may be carried out on the countercurrent principle by the use of a series of tanks arranged for counter-flow of the ore pulp and of the over-flow, so that a more or less complete separation of the colloids may be effected. The removal of the colloids may take place in tanks such as those of the Dorr, Allen or Callow types. With the overflow from such tanks there may be removed a corresponding amount of water so that the ore pulp will thereby become thickened. So much of the water may in fact be moved that only sufficient water and accompanying slimes remain to permit the handling of the pulp by pumping and its preparation for subsequent treatment.

While I have hereinbefore particularly described the removal of the dispersed colloidal constituents from the ore pulp by sedimentation and decantation, I do not wish to limit myself to this particular method of removing the colloids. Other methods for accomplishing the desired result are available. For example, I have found that colloidal constituents may be removed from an ore pulp by a flotation treatment, under conditions permitting the removal by flotation of the colloidal constituents to the extent desired, while substantially inhibiting the flotation of mineral particles. To this end the ore pulp containing the colloids is subjected to a flotation treatment with an appropriate frothing agent, the object of which is to produce a froth or scum containing the colloidal material, with a relatively small proportion of the valuable mineral or minerals contained in the pulp, and to separate this colloid-bearing froth from the body of the ore pulp, after which the ore pulp may be filtered in any desired or customary manner. I have found rosin soap in solution in water a satisfactory frothing agent for this purpose, although other soaps and other frothing agents are available which are colloid, rather than mineral selective.

After the coloidal matters have been removed from the ore pulp to the extent desired, in accordance with the principles of the present invention, the remaining ore pulp, thickened as required, is subjected to filtration in the usual manner. The usual filters now employed in the filtration of mineral pulp can be employed in the filtering of the colloid-freed ore pulp. Where a vacuum or pressure filter of the usual type is employed, the filter cake will form in the usual way, but this filter cake will be more porous and can be made thicker and dryer than has heretofore been possible, and moreover, it will be relatively free from colloidal matter, which, in almost any subsequent treatment of the filter cake, will give it enhanced value.

I claim:

1. The improvement in the method of filtering ore pulps containing colloidal matter, which comprises dispersing normally flocculated colloidal matter in the ore pulp, separating the dispersed colloidal matter from the ore pulp to an extent sufficient to substantially reduce its filtration-inhibitory effects, and thereafter subjecting the remaining ore pulp to filtration.

2. The improvement in the method of filtering ore pulps containing colloidal matter, which comprises adding to the ore pulp a dispersing agent for promoting dispersion of the colloidal matter, then removing the dispersed colloidal matter from the ore pulp to an extent sufficient to substantially reduce its filtration-inhibitory effects, and thereafter subjecting the remaining ore pulp to filtration.

3. The improvement in the method of filtering ore pulps containing colloidal matter, which comprises dispersing normally flocculated colloidal matter in the ore pulp, subjecting the ore pulp to sedimentation and decantation and removing the dispersed colloidal matter therefrom by decantation to an extent sufficient to substantially reduce its filtration-inhibitory effects, and thereafter subjecting the remaining ore pulp to filtration.

4. The improvement in the method of filtering ore pulps containing colloidal matter, which comprises adding to the ore pulp a dispersing agent for promoting dispersion of the colloidal matter, then subjecting the ore pulp to sedimentation and decantation and removing the dispersed colloidal matter therefrom by decantation to an extent sufficient to substantially reduce its filtration-inhibitory effects, and thereafter subjecting the remaining ore pulp to filtration.

5. The improvement in the method of filtering ore pulps containing colloidal matter, which comprises agitating the ore pulp in the presence of a dispersing agent for promoting the dispersion of the colloidal matter, then removing the dispersed colloidal matter from the ore pulp to an extent sufficient to substantially reduce its filtration-inhibitory effects, and thereafter subjecting the remaining ore pulp to filtration.

6. The improvement in the method of filtering ore pulps containing colloidal matter, which comprises subjecting the ore pulp to a grinding operation in the presence of a dispersing agent for promoting the dispersion of the colloidal matter, and then removing the dispersed colloidal matter from the ore pulp to an extent sufficient to substantially reduce its filtration-inhibitory effects, and thereafter subjecting the remaining ore pulp to filtration.

In testimony whereof I affix my signature.

WALTER O. BORCHERDT.